US011495949B2

(12) United States Patent
Weatherburn et al.

(10) Patent No.: US 11,495,949 B2
(45) Date of Patent: Nov. 8, 2022

(54) CABLE CLAMPING APPARATUS

(71) Applicant: CMP PRODUCTS LIMITED, Newcastle upon Tyne (GB)

(72) Inventors: Mark Weatherburn, Cramlington (GB); Lee Frizzell, Cramlington (GB)

(73) Assignee: CMP PRODUCTS LIMITED, Newcastle upon Tyne (GB)

( * ) Notice: Subject to any disclaimer, the term of this patent is extended or adjusted under 35 U.S.C. 154(b) by 380 days.

(21) Appl. No.: 16/633,046

(22) PCT Filed: Aug. 20, 2018

(86) PCT No.: PCT/EP2018/072421
§ 371 (c)(1),
(2) Date: Jan. 22, 2020

(87) PCT Pub. No.: WO2019/038226
PCT Pub. Date: Feb. 28, 2019

(65) Prior Publication Data
US 2020/0185895 A1    Jun. 11, 2020

(30) Foreign Application Priority Data
Aug. 25, 2017    (EP) .................................... 17188026

(51) Int. Cl.
*H02G 3/06*    (2006.01)
(52) U.S. Cl.
CPC ........... *H02G 3/0666* (2013.01); *H02G 3/065* (2013.01)

(58) Field of Classification Search
CPC ...... H02G 3/006; H02G 3/065; H02G 3/0675; H02G 3/0666; H02G 3/0658
See application file for complete search history.

(56) References Cited

U.S. PATENT DOCUMENTS 3,189,962 A * 6/1965 Hartwell .................. H02G 3/22
174/79
4,739,126 A    4/1988 Gutter et al.
(Continued)

FOREIGN PATENT DOCUMENTS

DE    102010027445 B3    12/2011
DE    202012101656 U1    7/2012
GB          2400503 A *    10/2004    ................ F16L 5/06
(Continued)

OTHER PUBLICATIONS

"International Search Report and Written Opinion" dated Nov. 14, 2018.

*Primary Examiner* — Paresh Paghadal
(74) *Attorney, Agent, or Firm* — Billion & Armitage

(57) ABSTRACT

A cable clamping apparatus (2) is disclosed. The apparatus comprises a housing (4) defining a first aperture (6) for a cable, an actuator member (24), and clamping members (22). Movement of the clamping members relative to the actuator member in an axial direction of a cable extending through the apparatus causes sliding movement of the clamping members relative to the actuator member between a first condition, in which the cable can move in the axial direction relative to the clamping members, and a one second condition, in which the cable is clamped between the clamping members. A plurality of the clamping members overlap in the axial direction.

15 Claims, 16 Drawing Sheets

(56) References Cited

U.S. PATENT DOCUMENTS 6,991,269 B2 * 1/2006 Legeai ............... F16L 19/086
                                                                           285/353
2017/0117692 A1 * 4/2017 Swan ................ H02G 3/0666

FOREIGN PATENT DOCUMENTS

| RU | 45207 U1 | 4/2005 |
| WO | 2016000901 A1 | 1/2016 |
| WO | 2016177860 A1 | 11/2016 |
| WO | 2019038226 A1 | 2/2019 |

\* cited by examiner

SINGLE CLAMP GLAND

SINGLE CLAMP GLAND

SINGLE CLAMP GLAND EXPLODED VIEW

SINGLE CLAMP ARRANGEMENT

SINGLE CLAMP ARRANGEMENT

DUAL CLAMP GLAND

DUAL CLAMP GLAND EXPLODED VIEW

CABLE CLAMPING APPARATUS

This application is a National Stage Application of PCT/EP2018/072421, filed on Aug. 20, 2018, which claims benefit of application Ser. No. 17/188,026.3, filed on Aug. 25, 2017 in Europe and which applications are incorporated herein by reference. A claim of priority to all, to the extent appropriate, is made.

The present disclosure relates to a clamping apparatus, and relates particularly, but not exclusively, to a cable clamping apparatus for incorporation in a cable gland.

Cable glands are used to mount cables to an enclosure, and generally have a gland body having an external screw threaded part for mounting to a threaded aperture in an enclosure, or to a threaded locking plate located on the opposite side of the aperture. The gland body is formed from two or more parts defining an aperture through which a cable passes, and one or more seals are located in the gland body for sealing against an external surface of the cable.

A clamping apparatus for use in such a cable gland is disclosed in WO 2016/000901, in which clamping members are pivotably mounted so that they can pivot into clamping engagement with a cable passing through the cable gland.

This known clamping apparatus has a number of potential limitations. Firstly, the pivotable clamping members are formed with pivot pins, which are pivotably located in apertures in the parts to which they are mounted. These pivot pins and apertures are difficult to construct robustly, as a result of which the pivot pins can bend or flex. Also, the presence of apertures in parts which receive the pivot pins limits the extent to which the clamping apparatus can be constructed compactly.

A further clamping apparatus for a cable gland is disclosed in U.S. Pat. No. 4,608,454, in which gripping dogs are moved into clamping contact with a cable by means of engagement of the gripping dogs with surfaces inclined relative to a longitudinal axis of a cable passing through the cable gland. However, this arrangement suffers from the drawback that the area of contact between the gripping dogs and the cable is limited, as a result of which there is a risk of damage to the cable for a given applied clamping force.

Preferred embodiments of the present disclosure seek to overcome one or more of the above disadvantages of the prior art.

According to an aspect of the present disclosure, there is provided a clamping apparatus for clamping an elongate object, the apparatus comprising:

a housing defining a first aperture therethrough for enabling an elongate object to extend through said apparatus;

actuator means; and a plurality of clamping members adapted to slidingly engage said actuator means;

wherein said actuator means and said clamping members are adapted to be arranged in said housing such that movement of said clamping members relative to said actuator means, in an axial direction of an elongate object extending through said apparatus, causes sliding movement of said clamping members relative to said actuator means between at least one first condition, in which said elongate object can move in said axial direction relative to said clamping members, and at least one second condition, in which said elongate object is clamped between said clamping members, and wherein a plurality of said clamping members are adapted to overlap in said axial direction.

By providing actuator means and clamping members arranged such that movement of the clamping members relative to the actuator means causes sliding movement of the clamping members relative to the actuator means between at least one first condition, in which the elongate object can move axially relative to the clamping members, and at least one second condition, in which the elongate object is clamped between said clamping members, this provides a number of advantages. Firstly, the necessity of manufacturing pivot pins, which could bend or flex, or components having apertures to receive the pivot pins, is avoided, which provides the advantage of enabling the apparatus to be made more robust and more compact. In addition, the range of diameters of elongate objects such as cables which can be clamped by the clamping apparatus can be wide, since the distance over which the clamping members slide axially relative to the clamping means can be large. In addition, the apparatus can be constructed such that tension in the elongate object urges the clamping members axially relative to the actuator means in an axial direction which causes an increase in clamping force applied by the clamping members, thereby improving pull-out resistance, and thus reliability, of the apparatus. Also, by providing clamping members which are adapted to overlap in the axial direction, this provides the advantage of enabling the entire circumference of the elongate object to be surrounded by clamping members, thereby enabling the area over which a given clamping force is applied to be maximised, and reducing the risk of damage to the elongate object and maximising the effectiveness of gripping. In the case of the elongate object being a cable, the ability to provide electrically conductive clamping members which contact the entire circumference of the cable provides the further advantage of providing more effective EMC (electromagnetic compatibility) screening, thereby minimising the effect of electromagnetic noise on apparatus connected to the cable. In addition, in the case of electrically conductive clamping members, by providing clamping members which pivot relative to the body, this enables the clamping members to be made of large cross sectional area, since the clamping members do not need to be flexible, thereby providing the advantage that the clamping members can be used to form a more effective path for fault current to pass from the cable to earth, thereby improving the safety of operation of the apparatus.

The actuator means may comprise a plurality of first engaging surfaces, and a plurality of said clamping members may each comprise a respective second engaging surface, adapted to engage a respective said first engaging surface, such that said movement of said plurality of clamping members relative to said actuator means, in an axial direction of an elongate object extending through said apparatus, causes radial movement of said plurality of clamping members relative to said actuating means.

The apparatus may comprise a first plurality of said first engaging surfaces and a second plurality of said first engaging surfaces, and the apparatus may comprise a first plurality of said clamping members having a first plurality of said second engaging surfaces, adapted to engage said first plurality of said first engaging surfaces, and a second plurality of said clamping members having a second plurality of said second engaging surfaces, adapted to engage said second plurality of said first engaging surfaces.

This provides the advantage of enabling a compact construction of clamping apparatus which can simultaneously clamp sheathed and unsheathed parts of an elongate object.

The actuator means may comprise a first actuator member, having said first plurality of first engaging surfaces, and a second actuator member, having said second plurality of first engaging surfaces.

This provides the advantage of enabling a wide range of different cable glands to be easily manufactured.

A plurality of said first and/or second engaging surfaces may be inclined relative to an axial direction of an elongate object extending through said housing.

A plurality of said first engaging surfaces may be provided on respective protrusions on said actuator means, and a plurality of said second engaging surfaces may be provided on respective recesses in said clamping members, wherein said recesses are located radially inwards of said protrusions in use.

This provides the advantage of causing the actuator member to act to hold the clamping members together, thereby improving the stability of the apparatus.

A plurality of said clamping members may each be adapted to slidingly engage a pair of further said clamping members arranged adjacent thereto when moving between a said first condition and a said second condition.

This provides the advantage of enabling an elongate object to be completely surrounded by clamping members, thereby maximising the area over which a clamping force is applied. This in turn enables a larger total clamping force to be applied, thereby improving the reliability of the apparatus. In the case of the elongate object being a cable and the clamping members being electrically conductive, this provides the further advantage of better EMC screening.

A plurality of said clamping members may each have a respective first engaging portion, adapted to slidingly engage a further said clamping member adjacent thereto radially outwards of said further clamping member, and a respective second engaging portion, adapted to slidingly engage said further clamping member radially inwards of said further clamping member.

This provides the advantage of improving the stability and reliability of the apparatus.

At least one said first engaging portion may have a respective first radially extending surface adapted to engage a second radially extending surface of a said second engaging portion of a further said clamping member.

This provides the advantage of providing axial support to the clamping members, thereby improving stability of the apparatus.

The apparatus may further comprise engaging means for preventing axial movement of a pair of adjacent said clamping members relative to each other.

This provides the advantage of making assembly of the apparatus easier and making operation of the apparatus more reliable by minimising the risk of mis-alignment of the clamping members relative to each other and/or relative to the housing.

The engaging means may comprise at least one protrusion on a said clamping member of said pair and at least one recess of the other said clamping member of said pair for slidably receiving a respective said protrusion.

The housing may comprise a first body part having a second aperture therethrough for receiving said elongate object, and a second body part having a third aperture therethrough for receiving said elongate object, and adapted to be mounted to said first body part, wherein said second and third apertures define said first aperture.

The second body part may be adapted to engage said first body part to cause axial movement of said clamping members relative to said actuator means.

At least one said clamping member may include at least one sheath penetrating portion adapted to penetrate a sheath of an elongate object passing through the apparatus.

This provides the advantage of enabling an earthing connection to be made to the elongate object, for example a cable (for example to a conductive sheath inside the penetrated sheath) at the same time as the elongate object is clamped.

At least one said sheath penetrating portion may comprise at least one spike.

The apparatus may further comprise biasing means for biasing a plurality of said clamping members towards said first condition.

This provides the advantage of making the apparatus easier to assemble, while also enabling the apparatus to be more easily inspected when a cable is absent.

The biasing means may comprise at least one biasing member adapted to engage a respective said clamping member and said actuator means.

At least one said biasing member may comprise a respective resilient annular member.

At least one said clamping member may be electrically conductive.

This provides the advantage of simplifying construction of the apparatus.

The apparatus may be adapted to clamp a cable.

According to another aspect of the present disclosure, there is provided a cable gland including a clamping apparatus as defined above.

Preferred embodiments of the disclosure will now be described, by way of example only and not in any limitative sense, with reference to the accompanying drawings, in which.

Figure 1:
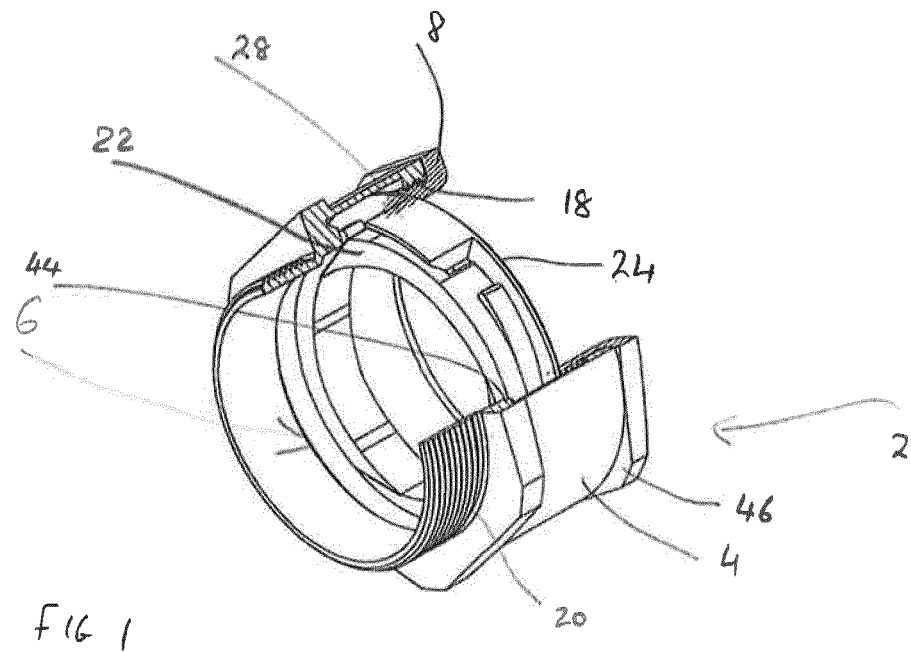
FIG. 1 is a perspective partially cut away view of a cable gland of a first embodiment.
Figure 2:
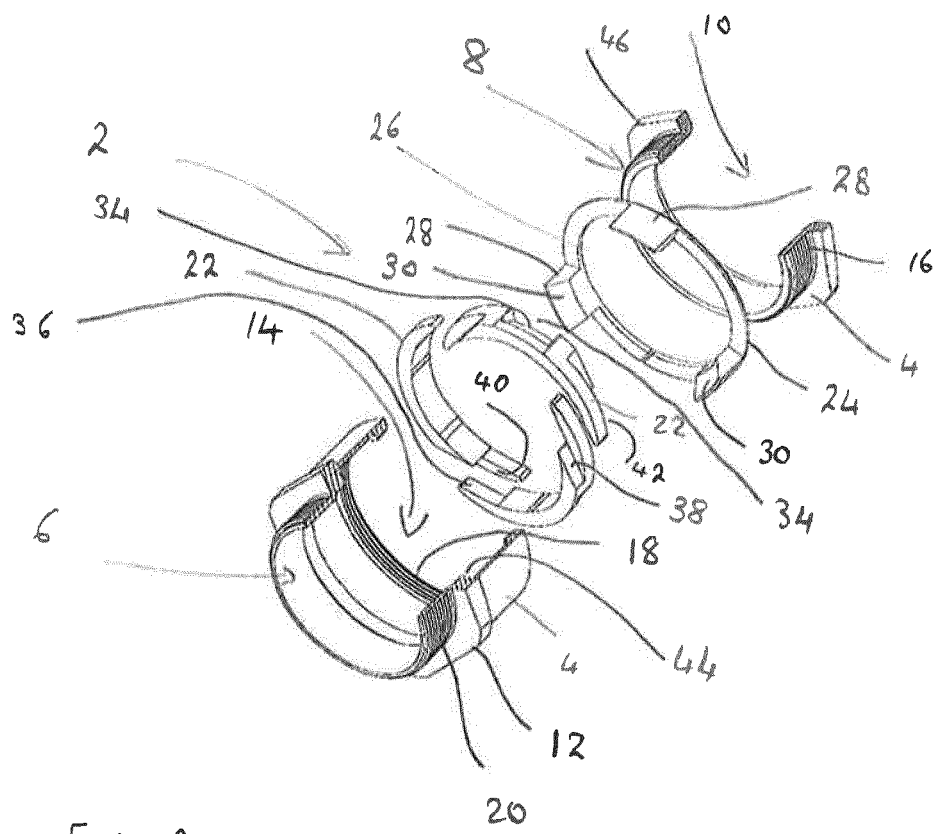
FIG. 2 is an exploded view of the cable gland of FIG. 1.
Figure 7:
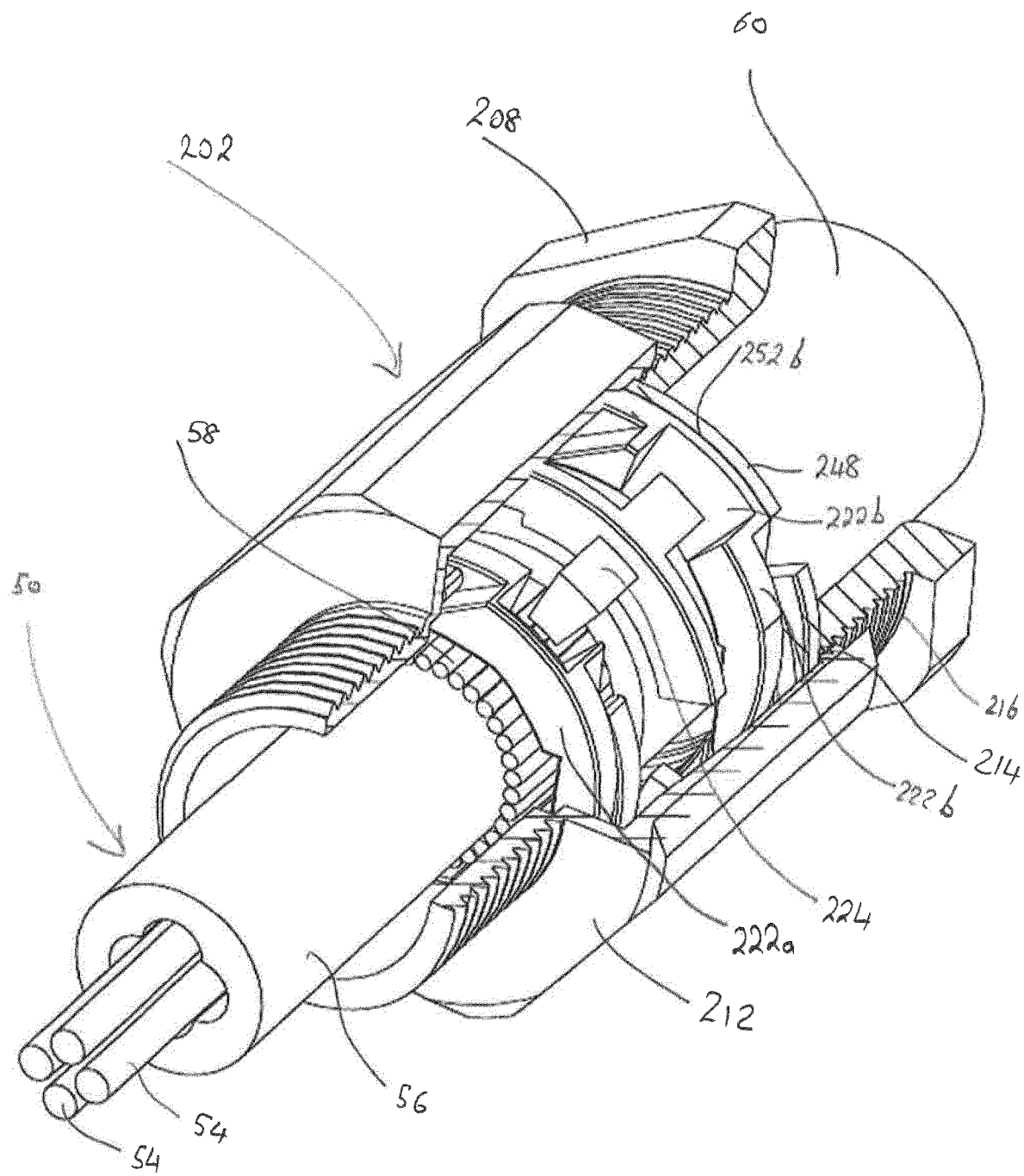
FIG. 7 is a perspective partially cut away view of the cable gland of FIG. 5 mounted to a cable.
Figure 8:
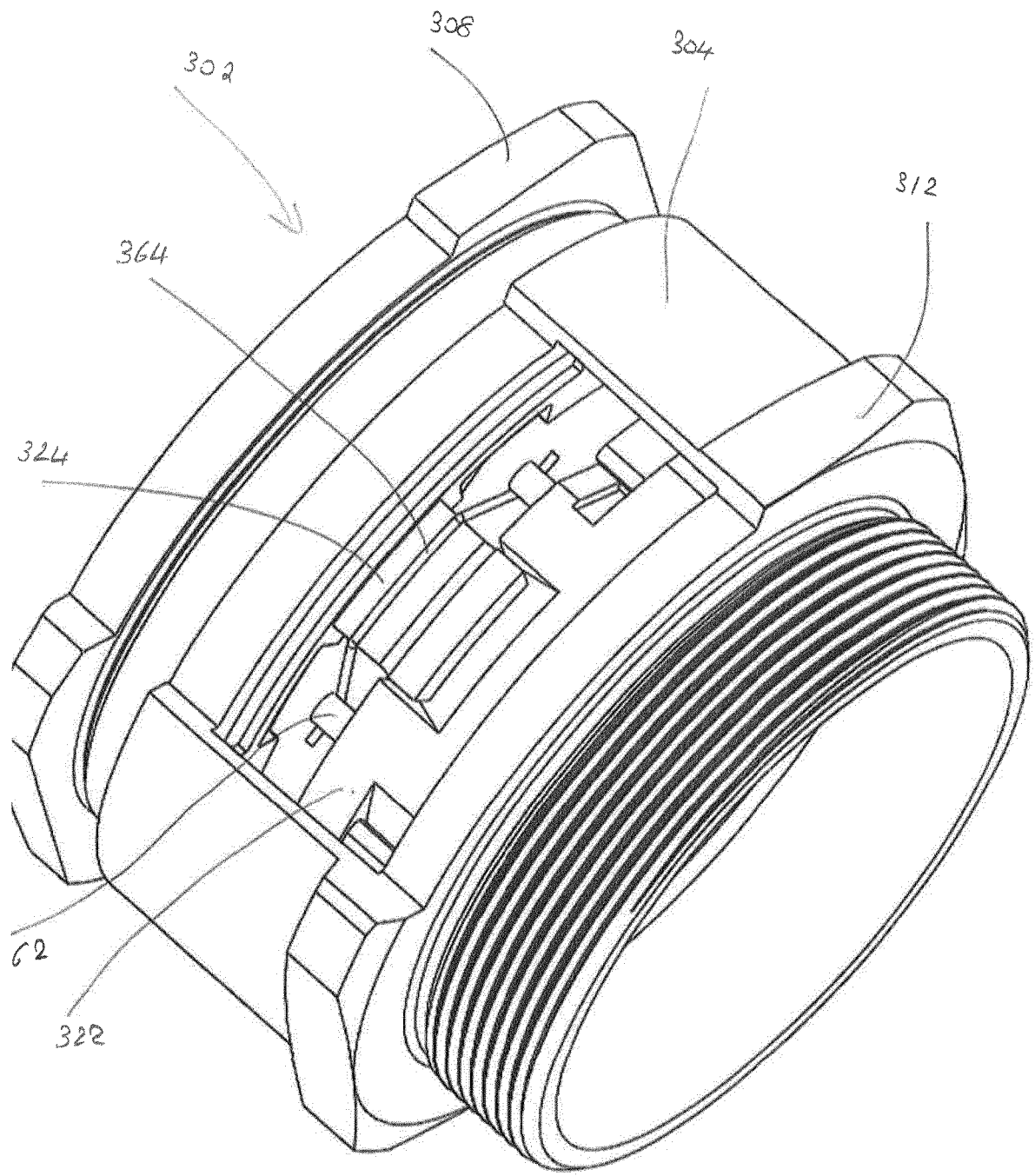
FIG. 8 is a perspective view of a cable gland of a fourth embodiment.
Figure 9:
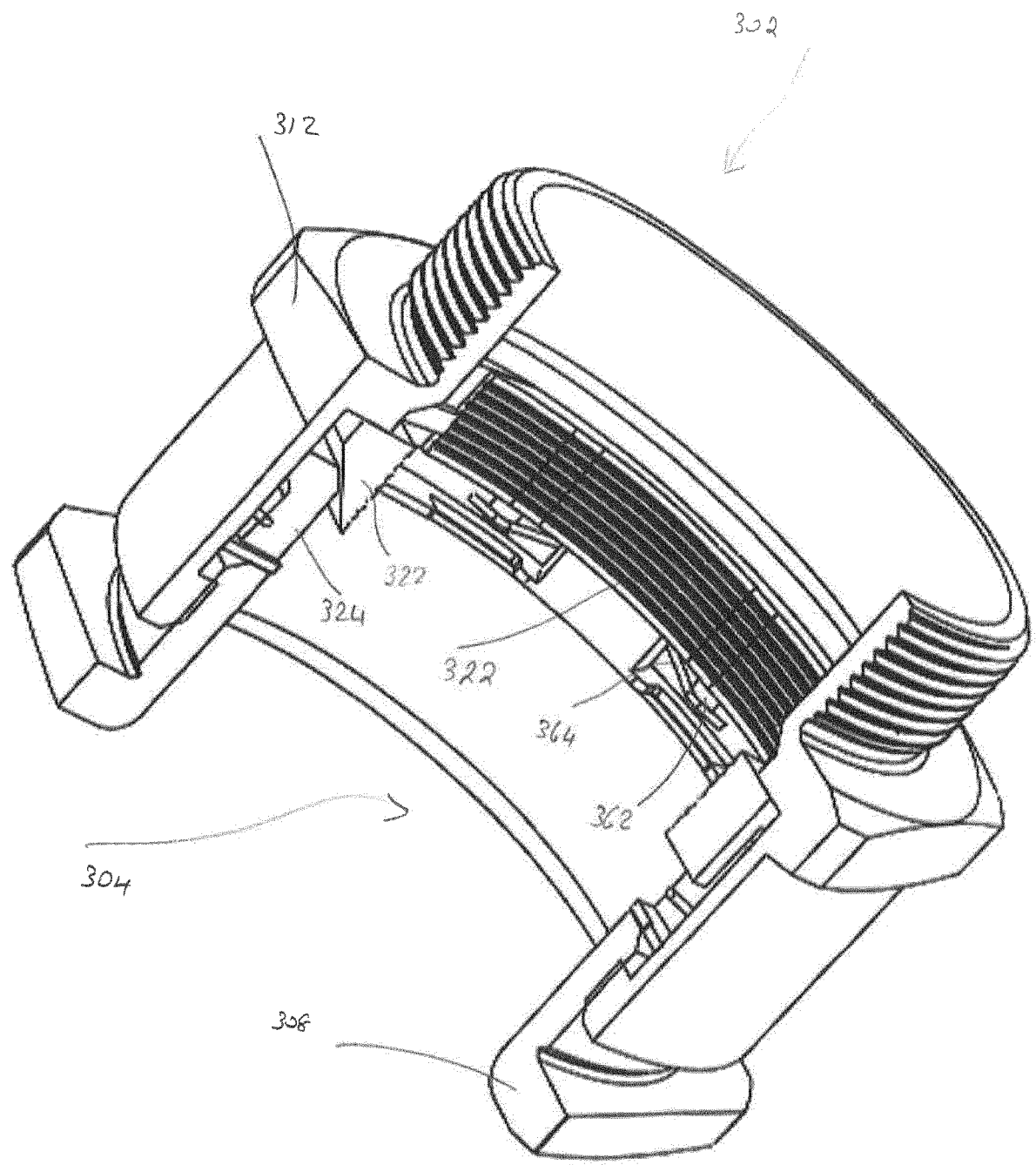
FIG. 9 is a perspective partially cut away view of the cable gland of FIG. 8.
Figure 10:
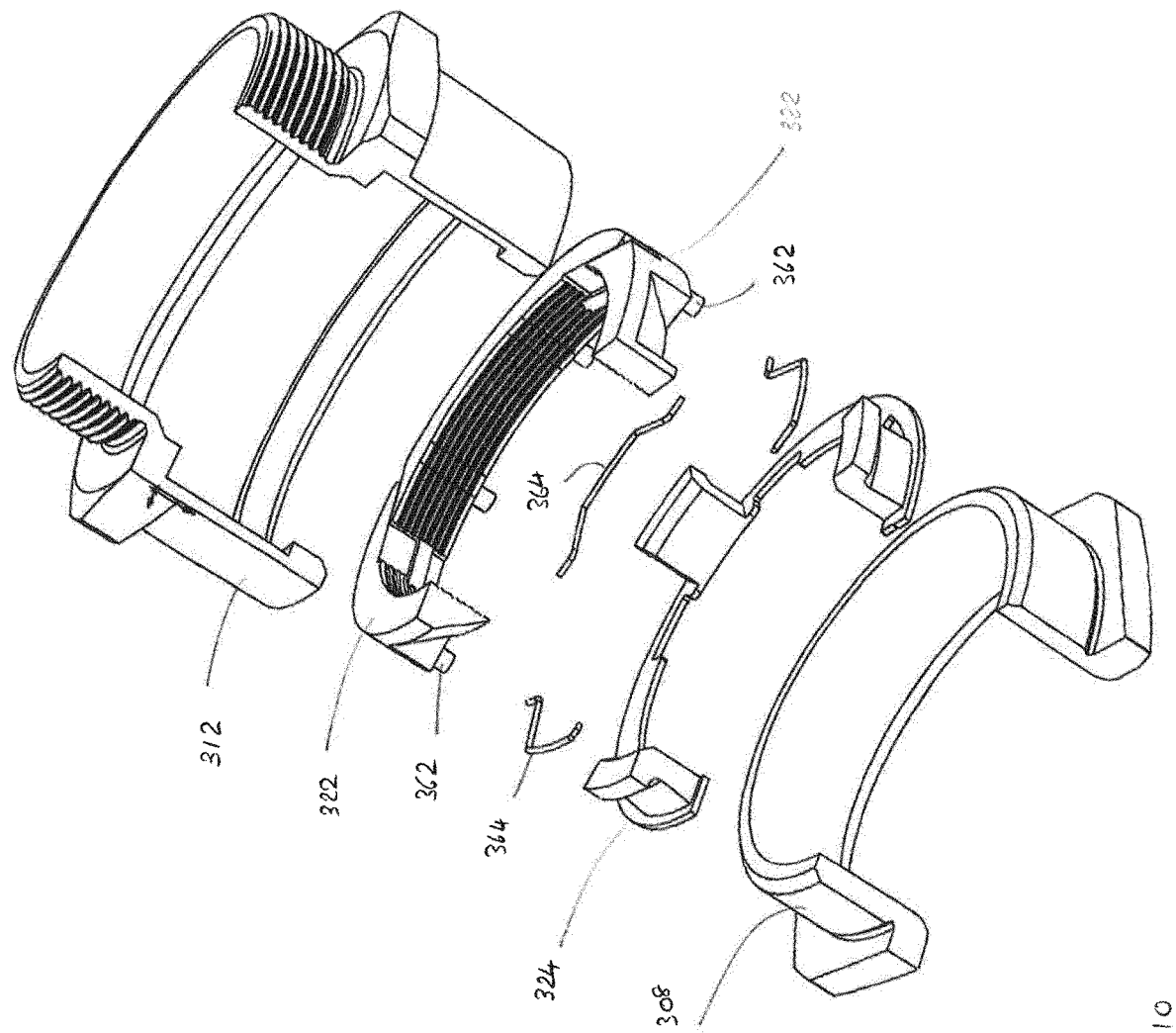
FIG. 10 is a partially cut away exploded view of the cable gland of FIG. 8.

Referring to FIGS. 1 and 2, a cable gland 2 of a first embodiment of the present invention includes a clamping apparatus having a housing 4 defining a first aperture 6 therethrough for receiving an elongate object in the form of a cable 50 (FIG. 7). The housing 4 includes a first body part 8 having a second aperture 10 therethrough for receiving the cable, and a second body part 12 having a third aperture 14 therethrough for receiving the cable. The first body part 8 has an external screw thread 16 for engaging an internal screw thread 18 on the second body part 12. The second body part 12 also has an external screw thread 20 for engaging an enclosure (not shown) to which the cable gland 2 is to be mounted. Engagement of the screw thread 16 of the first body part 8 with the screw thread 18 of the second body part 12 causes axial movement of the first body part 8 and second body part 12 relative to each other.

Three generally equiangularly arranged clamping members 22 are slidably mounted to each other within the housing 4 so as to surround a cable extending through the housing 4. The clamping members engage actuator means in the form of an annular actuator member 24 having an aperture 26 to enable the cable to extend therethrough and having equiangularly arranged protrusions 28 extending from a first end face of the actuator member 24. The clamping members can be made of a wide range of materials, for example plastics, or electrically conductive material if the clamping members are intended to form an earthing connection for the cable.

Each protrusion 28 is provided with a respective first engaging surface in the form of a first inclined surface 30, which slidably engages a corresponding second engaging surface in the form of a second inclined surface 32 provided in a respective recess 34 in one of the clamping members 22. Axial movement of the first inclined surfaces 30 of the clamping members 22 over the second inclined surfaces 32 of the protrusions 28 on the actuator member 24 causes the clamping members 22 to slidingly engage each other and move radially inwards or outwards relative to the cable extending through the housing 4, in dependence on the direction of axial movement.

Each clamping member 22 slidably engages one of the other two clamping members 22 at each of its ends via a first engaging portion having an inner surface 36 slidingly engaging a corresponding second engaging portion having an outer surface 38 on the adjacent clamping member 22. In this way, each clamping member 22 is supported on radially inner and outer surfaces of its ends by each of its neighbouring clamping members 22, providing stability as the clamping members 22 slide radially inwards or outwards as the second inclined surfaces 32 of the clamping members 22 slide along the first inclined surfaces 30 on the actuator member 24. In addition, each clamping member 22 has a first radially extending surface 40 facing away from the actuator member 24, for engaging a second radially extending surface 42 facing towards the actuator member 24, so that the clamping members 22 also provide support to each other in an axial direction.

In this way, adjacent pairs of clamping members 22 overlap in the axial direction of a cable passing through the cable gland 2, thereby enabling the clamping members 22 to move relative to each other while surrounding the entire circumference of the cable. This in turn enables the area over which a given gripping force is applied to the cable to be maximised, thereby minimising the risk of damage to the cable, and enabling a larger gripping force to be applied.

The operation of the cable gland 2 and clamping apparatus shown in FIGS. 1 and 2 will now be described. A cable is inserted through the clamping apparatus 2 so that it extends through the first 8 and second 12 body parts and the actuator member 24, and is surrounded by the clamping members 22. The clamping members 22 are initially sufficiently spaced from the longitudinal axis of the clamping apparatus 2 to enable insertion of the cable. The first 8 and second 12 body parts are arranged relative to each other such that the ends of the clamping members 22 facing away from the first body part 8 abut an inner radial surface 44 of the second body part 12, and the end face of the actuator member 24 facing away from the second body part 12 abuts a flange 46 on the first body part 8 arranged outwards of the screw thread 16 on the first body part 8.

Further threaded engagement of the first body part 8 with the second body part 12 moves the flange 46 and inner radial surface 44 towards each other, which causes sliding movement of the second inclined surfaces 32 of the clamping members 22 along the first inclined surfaces 30 of the actuator member 24. This in turn causes the clamping members 22 to slidingly engage each other and move towards the longitudinal axis of the cable, until the clamping members 22 are brought into clamping engagement with the cable.

An attempt to pull the cable out of the housing 4 causes the clamping members 22 to further slide along the first inclined surfaces 30 on the actuator member 24, thereby moving the clamping members 22 further radially inwards and increasing the clamping force applied to the cable.

Figure 3:
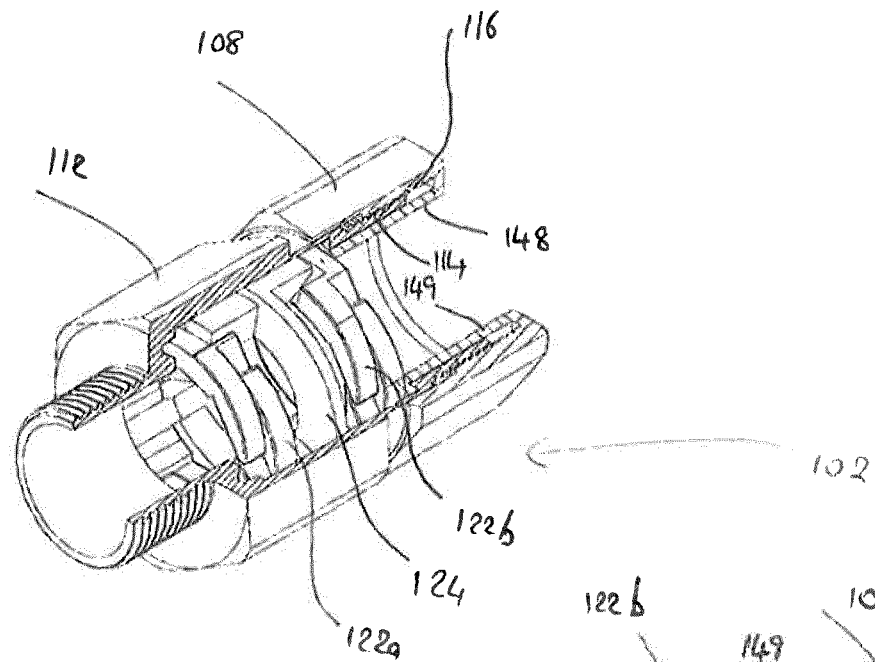
FIG. 3 is a perspective partially cut away view of a cable gland of a second embodiment.
Figure 4:
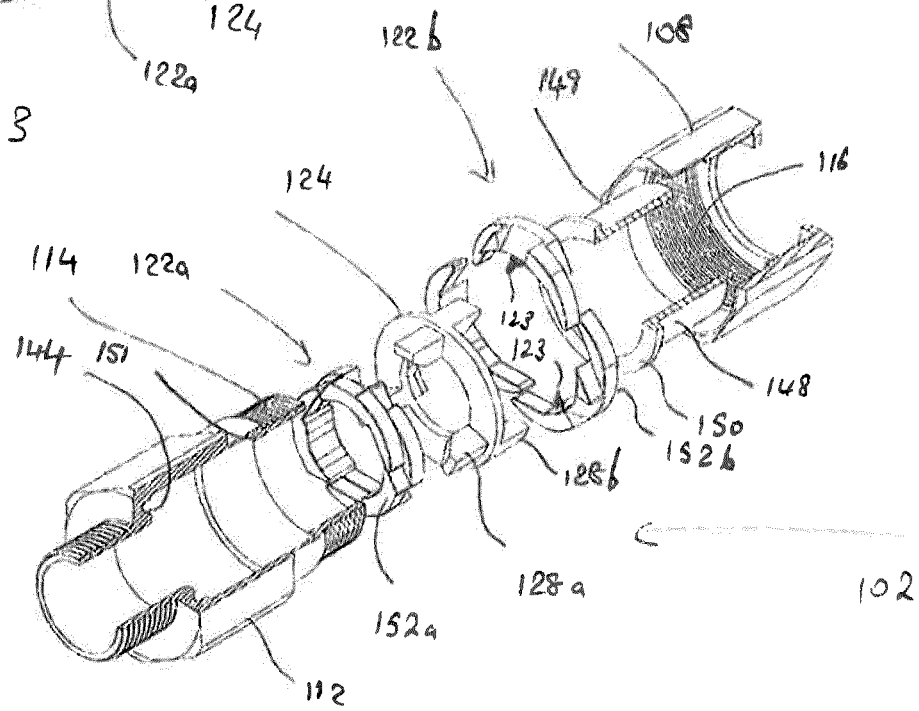
FIG. 4 is an exploded view of the cable gland of FIG. 3.

Referring to FIGS. 3 and 4, in which parts common to the embodiment of FIGS. 1 and 2 are denoted by like reference numerals but increased by 100, a cable gland 102 of a second embodiment of the present invention is shown. Actuator member 124 is provided with a first set of protrusions 128a on a first end face thereof, and a second set of protrusions 128b on a second end face thereof. The first 128a and second 128b sets of protrusions engage respective first 122a and second 122b sets of clamping members, arranged on opposite sides of the actuator member 124 so that each set of clamping members 122a, 122b can clamp a cable extending through the housing. For example, the first set of clamping members 122a can engage the cable at a location where an external sheath of the cable has been removed, and the second set of clamping members 122b can engage the sheath of the cable where it has not been removed. In addition, the second clamping members 122b are provided with sheath penetrating portions in the form of spikes 123, for penetrating an outer sheath 60 (FIG. 7) of a cable 50. This enables the clamping members 122b to simultaneously grip the cable 50 and form an earthing connection with a conductive sheath (not shown) of the cable 50.

An insert 148 has a split cylindrical body 149 and an end flange 150. The split cylindrical body 149 enables the insert 148 to be radially compressed, so that it can be located within the second body part 112 so that the flange 150 abuts a stepped surface 151 on the second body part 112 to enable the internal screw thread 116 on the first body part 108 to engage the external screw thread 114 on the second body part 112. The end flange 150 provides an abutment surface for end faces 152b of the second clamping members 122b facing away from the actuator member 124. End faces 152a of the first clamping members 122a facing away from the actuator member 124 abut a radially inner surface 144 of second body part 112, and movement of the first body part 108 towards the second body part 112 is achieved by threaded engagement of internal screw thread 116 on the first body part 108 with external screw thread 114 on the second body part 112.

Figure 5:
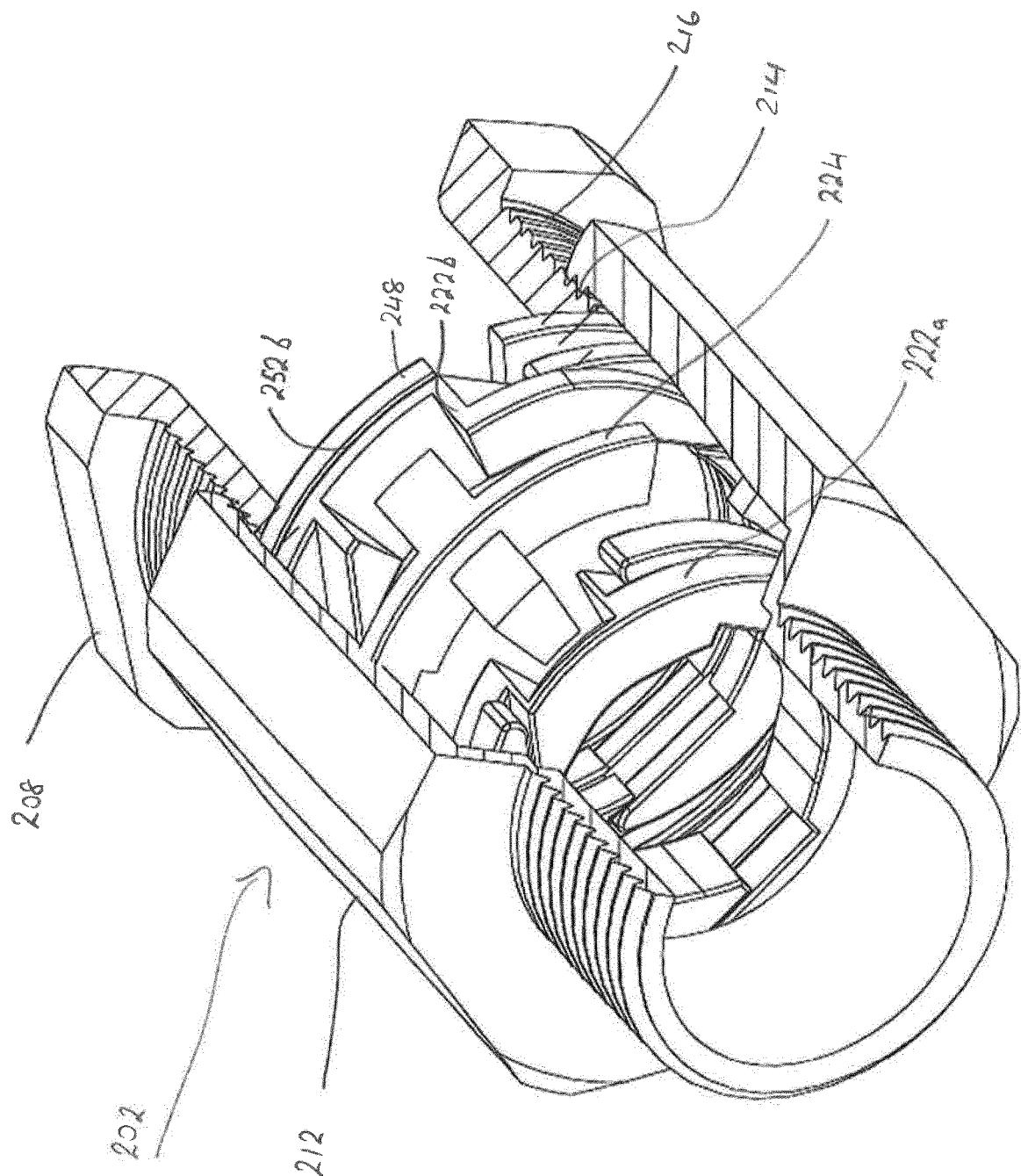
FIG. 5 is a perspective partially cut away view of a cable gland of a third embodiment.
Figure 6:
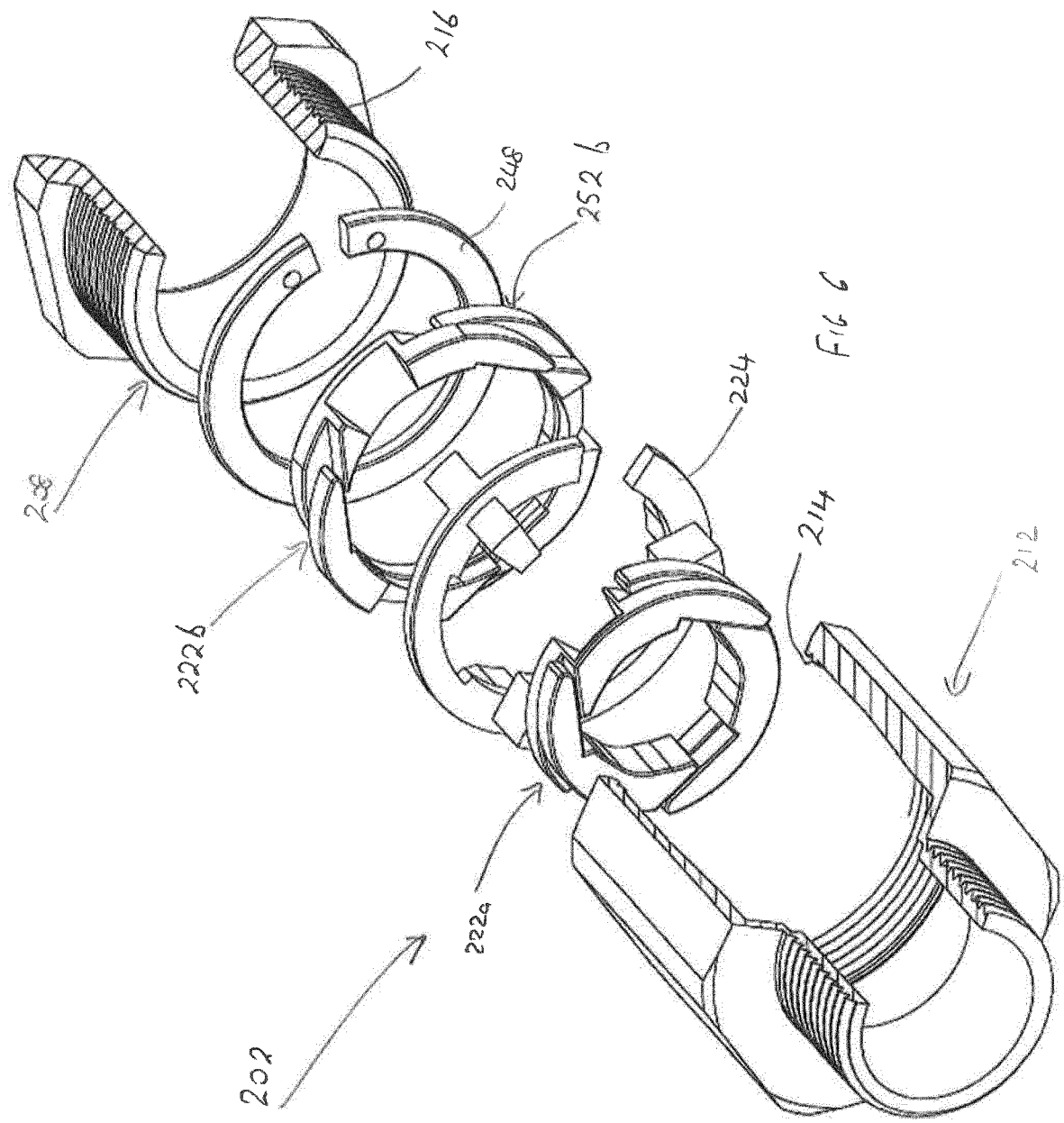
FIG. 6 is an exploded view of the cable gland of FIG. 5.

Referring to FIGS. 5 to 7, in which parts common to the embodiment of FIGS. 3 and 4 are denoted by like reference numerals but increased by 100, a cable gland 202 of a third embodiment is shown. Cable 50 has electrically conductive cores 54, an inner protective sheath 56, electrically conductive armouring 58 and outer protective sheath 60. A resilient split ring 248 is radially compressible to enable it to be located within an end of second body member 212 and to abut an end face of first body member 208. The split ring 248 forms an abutment surface for end faces 252b of second clamping members 222b facing away from actuator member 224.

The operation of the cable gland 202 will now be described.

The cable 50 is treated to expose the inner cores 54, inner sheath 56, conductive armour 8 and outer sheath 60 as shown in FIG. 7, and the cable is then inserted through the cable gland 202 so that first clamping members 222a are located adjacent the conductive sheath 58 and the second clamping members 222b are located adjacent the outer sheath 60. The clamping members 222a, 222b and actuator member 224 are located inside the second body part 212, and the split ring 248 is radially compressed and located in an end of the second body part 212 inwards of internal screw thread 214 of the second body part 212. External screw thread 216 on first body part 208 is then mounted to the internal screw thread 214 and threaded engagement of screw threads 214, 216 causes the first 208 and second 212 body parts to move axially towards each other. This in turn causes sliding movement of the clamping members 222a, 222b relative to the actuator member 224 to bring the clamping members 222a into clamping engagement with the conductive sheath 58 of cable 50 and the clamping members 222b into clamping engagement with the external sheath 60 of the cable 50.

FIGS. 8 to 11 show a cable gland 302 of a fourth embodiment, in which parts common to the embodiment of FIGS. 1 and 2 are denoted by like reference numerals but increased by 300. The cable gland 302 has first 308 and second 312 body parts which define a housing 304 containing clamping members 322 and actuator member 324. Each of the clamping members 322 is provided with a pair of generally cylindrical pegs 362 for abutting biasing means in the form of a respective flexible metal biasing member 364. Each biasing member 364 is flexed to engage a respective pair of pegs 362 of a respective clamping member 322 and a respective protrusion 328 of the actuator member 324, to bias the clamping members 322 radially outwards relative to the actuator member 324. In this way, as the first 308 and second 312 body parts are moved apart, the biasing members 364 urge the clamping members 322 radially outwards.

Figure 11:
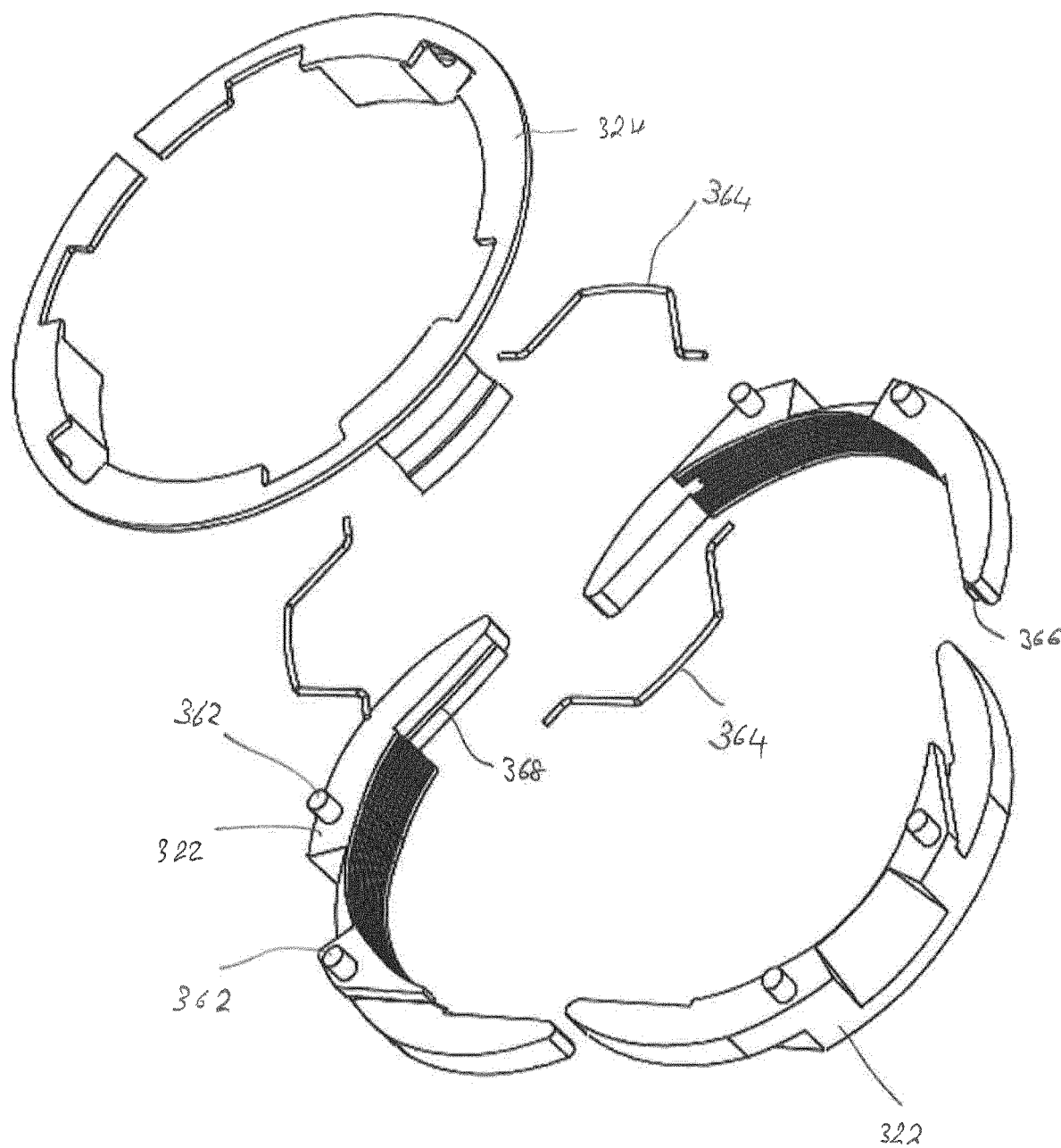
FIG. 11 is an exploded view of the clamping apparatus of the cable gland of FIG. 8.
Figure 12:
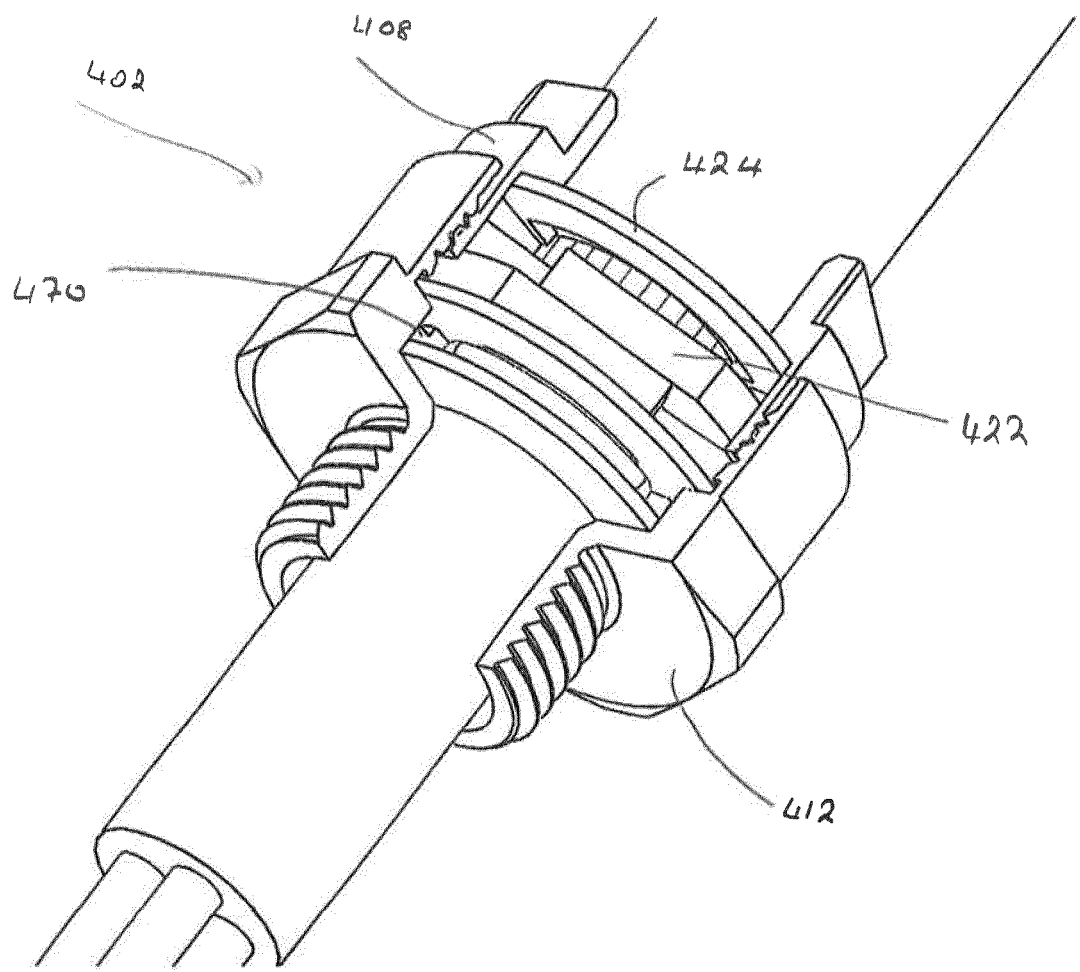
FIG. 12 is a perspective partially cut away view of a cable gland of a fifth embodiment.
Figure 13:
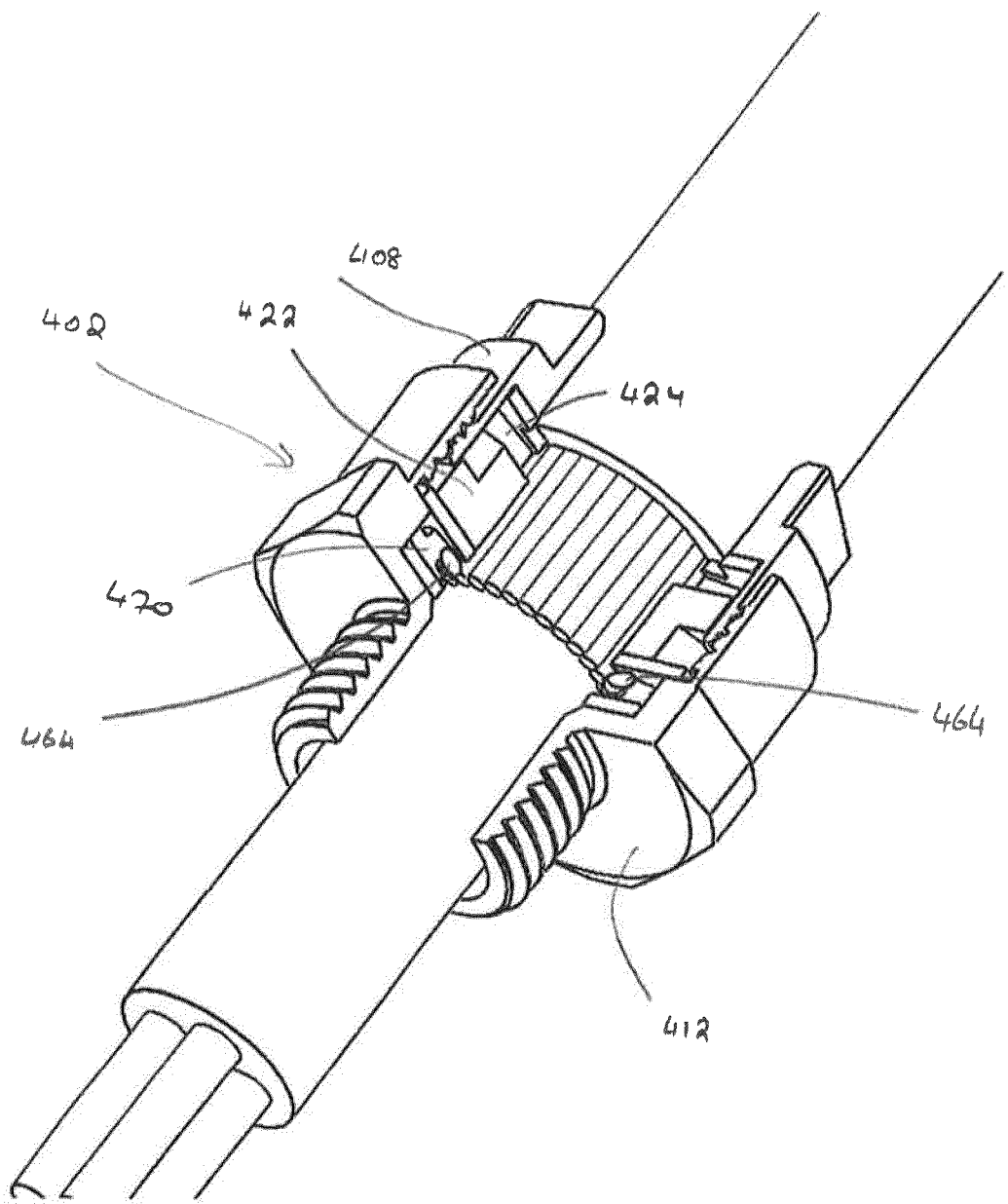
FIG. 13 is a perspective partially cut away view of the cable gland of FIG. 12, with the clamping apparatus also partially cut away.
Figure 14:
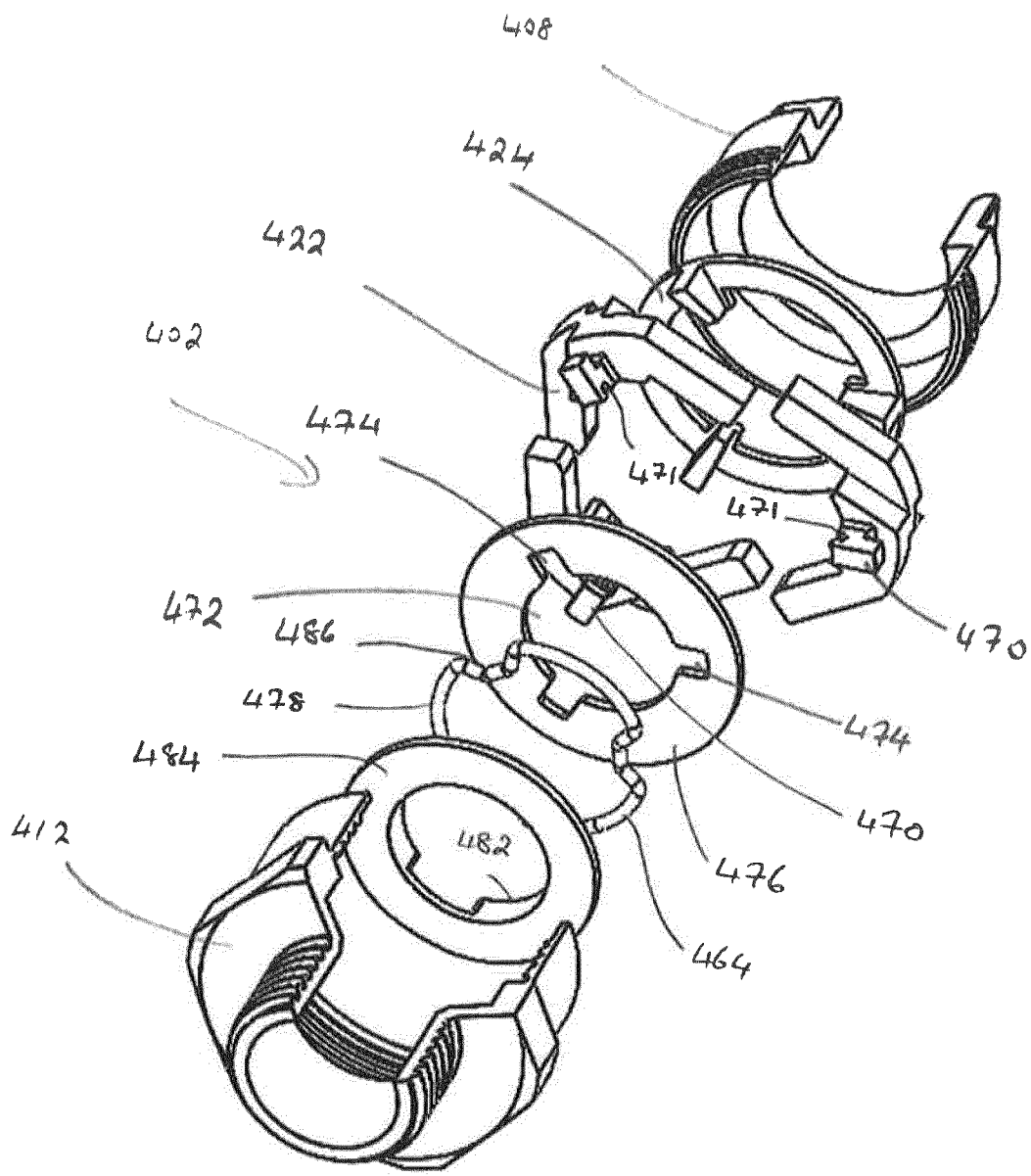
FIG. 14 is an exploded perspective view of the cable gland of FIG. 12.
Figure 15:
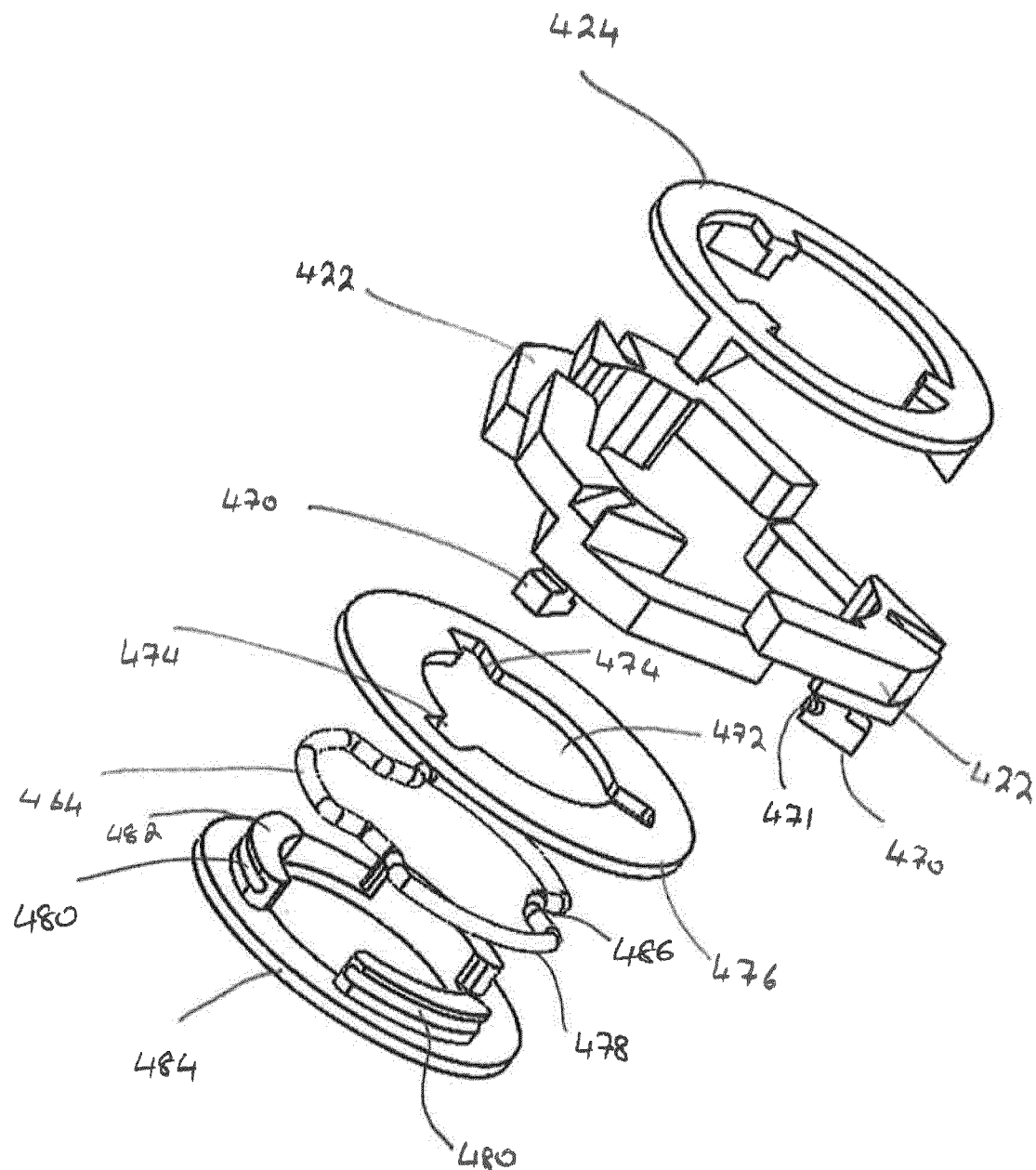
FIG. 15 is an exploded perspective view of the clamping apparatus of the cable gland of FIG. 14.
Figure 16:
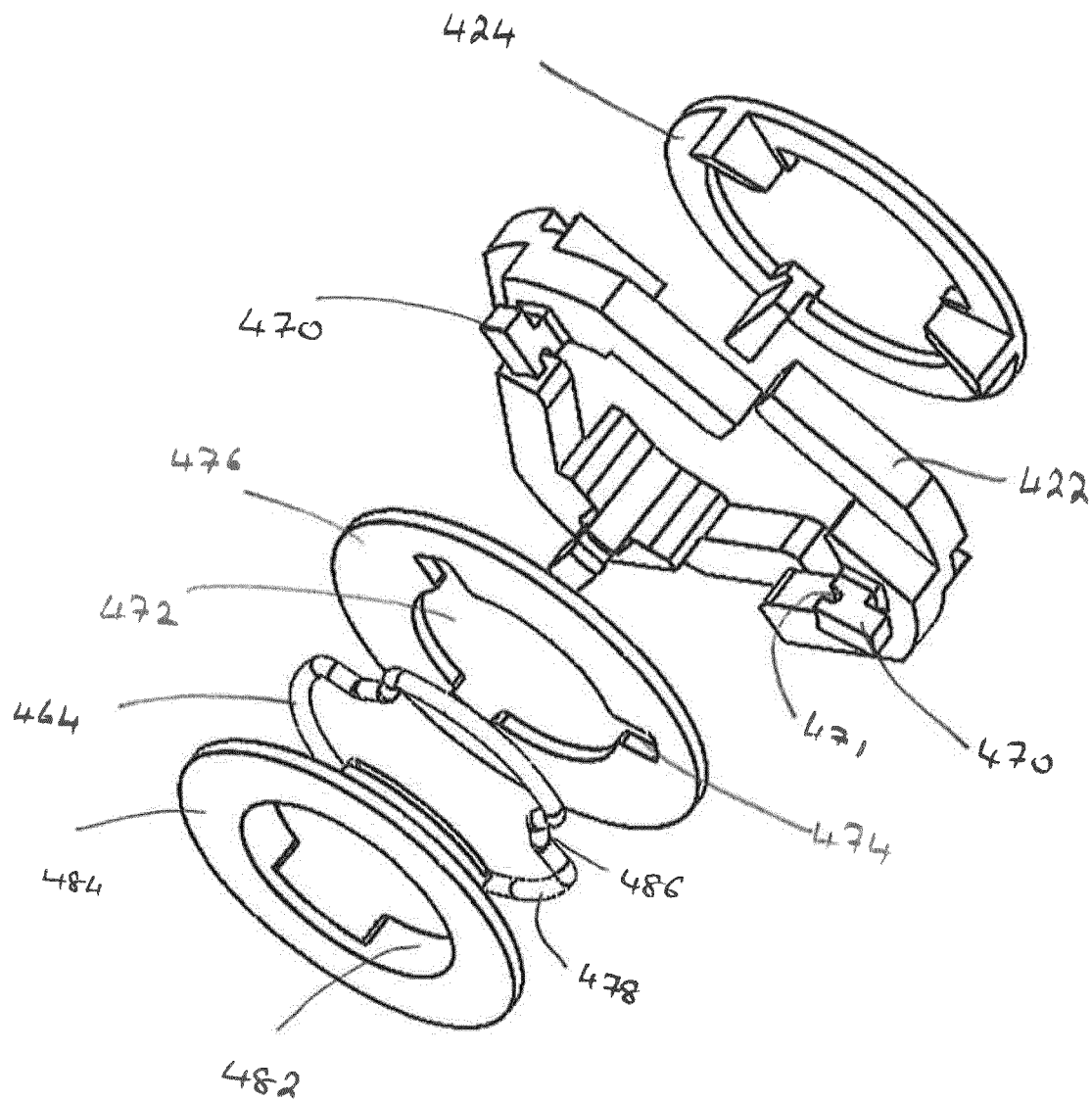
FIG. 16 is a further exploded perspective view of the clamping apparatus of FIG. 15.

As shown in more detail in FIG. 11, each of the clamping members 322 is also provided with engaging means in the form of a protrusion 366 at one end of the clamping member 322 and a recess 368 at the other end of the clamping member 322 for slidably receiving a protrusion 366 on another clamping member 322. Engagement of the protrusion 366 of one clamping member 322 in a corresponding recess 368 of an adjacent clamping member 322 prevents axial separation of the clamping members 322, which in turn assists assembly of the cable gland 302 and its reliability of operation.

Referring to FIGS. 12 to 16, in which parts common to the embodiment of FIGS. 8 to 11 are denoted by like reference numerals but increased by 100, a cable gland 402 of a fifth embodiment is shown. The cable gland 402 has first 408 and second 412 body parts, clamping members 422 and actuator member 424. Each of the clamping members 422 is provided with a protrusion 470 which extends through an aperture 472 in and engages a respective slot 474 in an earthing plate 476, which limits the extent to which the clamping members 422 can move radially outwards. Biasing means in the form of a resilient biasing member 464 in the form of an annular resilient member of suitable material such as elastomer or spring steel has convex parts 478 which engage respective grooves 480 on protrusions 482 of a support plate 484, and concave parts 486, each of which engages a respective groove 471 on a protrusion 470 on one of the clamping members 422 and urges the clamping members radially outwards. As the first 408 and second 412 body parts are moved towards each other as a result of threaded engagement of the first 408 and second 412 body parts with each other, engagement of the clamping members 422 with the actuator member 424 causes the clamping members 422 to move radially inwards against the action of the biasing member 464. When the first 408 and second 412 body parts are moved away from each other as a result of threaded engagement of the first 408 and second 412 body parts with each other, the clamping members 422 are urged radially outwards by the biasing member 464.

Figure 17:
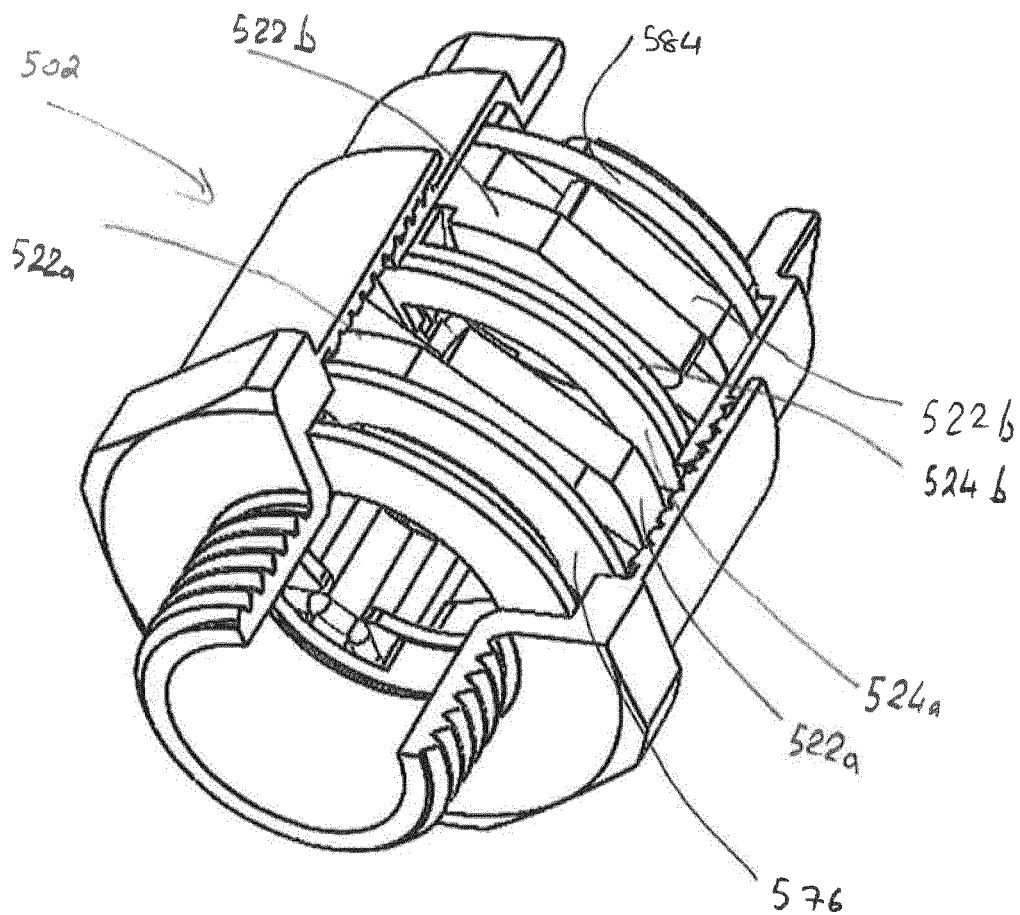
FIG. 17 is a perspective partially cut away view of a cable gland of a sixth embodiment of the present invention.
Figure 18:
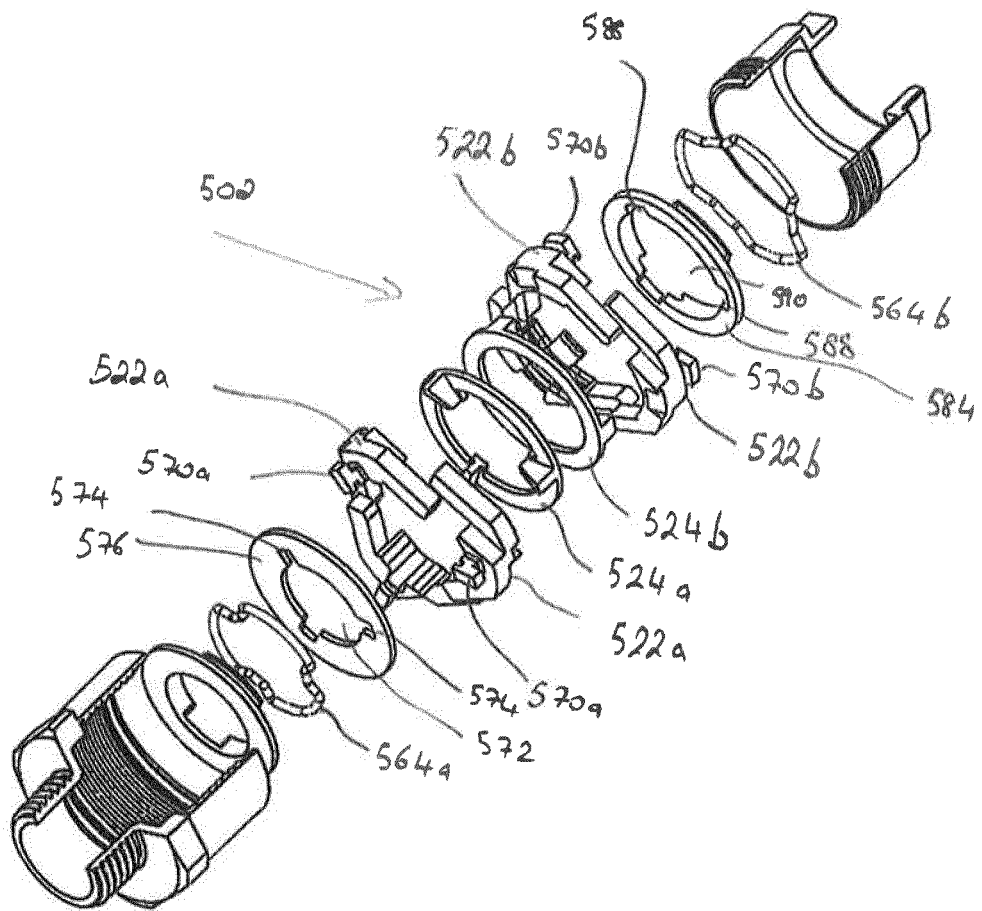
FIG. 18 is an exploded perspective view of the cable gland of FIG. 17.

Referring to FIGS. 17 and 18, in which parts common to the embodiment of FIGS. 12 to 16 are denoted by like reference numerals but increased by 100, a cable gland 502 of a sixth embodiment is shown. The cable gland 502 has a first set of clamping members 522a having first protrusions 570a and engaging a first actuator member 524a, and second clamping members 522b having second protrusions 570b and engaging a second actuator member 524b, in a manner similar to the embodiment shown in FIGS. 5 to 7. The first clamping members 522a are urged radially outwards by means of a first biasing member 564a and the extent of radially outward movement of the first clamping members 522a is limited by engagement of the first protrusions 570a with notches 574 in an aperture 572 provided in an earthing plate 576. The second clamping members 522b are urged radially outwards by means of a second biasing member 564b, and radially outward movement of the second clamping members 522b is limited by engagement of the second protrusions 570b with slots 588 provided in an aperture 590 through a support plate 584.

It will be appreciated by persons skilled in the art that the above embodiments have been described by way of example only and not in any limitative sense, and that various alterations and modifications are possible without departure from the scope of the disclosure as defined by the appended claims.

The invention claimed is:

1. A clamping apparatus for clamping an elongate object, the apparatus comprising:
    a housing defining a first aperture therethrough for enabling an elongate object to extend through said apparatus, wherein the housing comprises a first body part having a second aperture therethrough for receiving said elongate object, and a second body part having a third aperture therethrough for receiving said elongate object, wherein the second body part is adapted to be mounted to said first body part, and wherein said second and third apertures define said first aperture;
    an actuator device arranged in said housing; and
    a plurality of clamping members adapted to slidingly engage said actuator device;
    wherein said clamping members are arranged in said housing and the second body part is adapted to engage said first body part to cause movement of said clamping members relative to said actuator device, in an axial direction of an elongate object extending through said apparatus, wherein said movement of said clamping members relative to said actuator device causes sliding movement of said clamping members relative to said actuator device between at least one first condition, in which said elongate object can move in said axial direction relative to said clamping members, and at least one second condition, in which said elongate object is clamped between said clamping members, wherein a plurality of said clamping members are each adapted to slidingly engage a pair of further said clamping members arranged adjacent thereto when moving between said first condition and said second condition, wherein said actuator device comprises a plurality of first engaging surfaces, and a plurality of said clamping members each comprise a respective second engaging surface, adapted to engage a respective said first engaging surface, such that said movement of said plurality of clamping members relative to said actuator device, in an axial direction of an elongate object extending through said apparatus, causes radial movement of said plurality of clamping members relative to said actuator device, wherein a plurality of said clamping members each has a respective first engaging portion, adapted to slidingly engage a further said clamping member adjacent thereto, at a location radially outwards of said further clamping member, and a respective second engaging portion, adapted to slidingly engage said further clamping member at a location radially inwards of said further clamping member, and wherein at least one said first engaging portion has a respective first radially extending surface adapted to engage a second radially extending surface of said second engaging portion of a further said clamping member.

2. The apparatus according to claim 1, comprising a first plurality of said first engaging surfaces and a second plurality of said first engaging surfaces, and the apparatus comprises a first plurality of said clamping members having a first plurality of said second engaging surfaces, adapted to engage said first plurality of said first engaging surfaces, and a second plurality of said clamping members having a second plurality of said second engaging surfaces, adapted to engage said second plurality of said first engaging surfaces.

3. The apparatus according to claim 2, wherein at least one said actuator device comprises a first actuator member, having said first plurality of first engaging surfaces, and a second actuator member, having said second plurality of first engaging surfaces.

4. The apparatus according to claim 1, wherein a plurality of said first and/or second engaging surfaces are inclined relative to an axial direction of an elongate object extending through said housing.

5. The apparatus according to claim 1, wherein a plurality of said first engaging surfaces is provided on respective protrusions on at least one said actuator device, and a plurality of said second engaging surfaces is provided on respective recesses in said clamping members, wherein said recesses are located radially inwards of said protrusions in use.

6. The apparatus according to claim 1, further comprising at least one engaging device for preventing axial movement of a pair of adjacent said clamping members relative to each other.

7. The apparatus according to claim 6, wherein at least one said engaging device comprises at least one protrusion on said clamping member of said pair and at least one recess of the other said clamping member of said pair for slidably receiving a respective said protrusion.

8. The apparatus according to claim 1, wherein at least one said clamping member includes at least one sheath penetrating portion adapted to penetrate a sheath of an elongate object passing through the apparatus.

9. The apparatus according to claim 8, wherein at least one said sheath penetrating portion comprises at least one spike.

10. The apparatus according to claim 1, further comprising at least one biasing device for biasing a plurality of said clamping members towards said first condition.

11. The apparatus according to claim 10, wherein at least one said biasing device comprises at least one biasing member adapted to engage a respective said clamping member and at least one said actuator device.

12. The apparatus according to claim 11, wherein at least one said biasing member comprises a respective resilient annular member.

13. The apparatus according to claim 1, wherein at least one said clamping member is electrically conductive.

14. The apparatus according to claim 1, wherein the apparatus is adapted to clamp a cable.

15. A cable gland including the apparatus according to claim 1.

* * * * *